United States Patent [19]

Turek et al.

[11] 4,021,211

[45] May 3, 1977

[54] PROCESS AND APPARATUS FOR SEPARATION OF SOLVENTS FROM AN AIR STREAM LADEN WITH SOLVENT VAPORS

[76] Inventors: Klaus Turek, 5620 Vellbert; Martin Schumacher, Bucheneck 10, 2819 Nordwohlde; Richard Zimmermann, Schwachhauser Heerstr. 311, 28 Bremen, all of Germany

[22] Filed: Feb. 26, 1975

[21] Appl. No.: 553,100

[52] U.S. Cl. .................................... 55/18; 55/59; 55/74
[51] Int. Cl.$^2$ ........................................ B01D 53/04
[58] Field of Search ............. 55/18, 19, 59, 62, 74, 55/161, 162, 163

[56] References Cited

UNITED STATES PATENTS

| | | | |
|---|---|---|---|
| 1,453,215 | 4/1923 | Voress et al. | 55/59 X |
| 2,211,162 | 8/1940 | Ray et al. | 55/59 X |
| 3,162,513 | 12/1964 | Fourroux | 55/19 |
| 3,584,441 | 6/1971 | Strimling | 55/162 |
| 3,883,325 | 5/1975 | Fuhring | 55/163 X |
| 3,917,931 | 11/1975 | Sweeney | 55/18 X |

*Primary Examiner*—John Adee
*Attorney, Agent, or Firm*—Charles Hieken; Jerry Cohen

[57] ABSTRACT

A process and apparatus for separation of solvents from an air stream laden with solvent vapors by adsorption using active carbon followed by regeneration of the carbon by desorption by steam using a plurality of active carbon chambers. The sequence of charging and regeneration of the active carbon is controlled automatically in dependence upon the concentration of solvent vapors in the air stream. During the change over from charging to regeneration the active carbon is first subjected to desorption by steaming with a large volume of steam and then, when steam breaks through on the outlet side of the carbon the volume of steam is reduced for the purpose of drying the carbon. The change over is effected by a measuring device arranged on the outlet side of the carbon chamber responsive to a pre-determined threshold concentration of solvent vapors in the outgoing stream.

6 Claims, 3 Drawing Figures

4,021,211

PROCESS AND APPARATUS FOR SEPARATION OF SOLVENTS FROM AN AIR STREAM LADEN WITH SOLVENT VAPORS

BACKGROUND OF THE INVENTION

This invention relates to a process and an apparatus for the separation of solvents from an air stream laden with solvent vapours, hereinafter referred to as the "charged air stream", by adsorption by means of active carbon introduced into said air stream, followed by regeneration of the carbon with desorption by a stream of steam, particularly using two or more activated carbon chambers.

The problem of separation of solvents from the charged air stream by adsorption by means of active carbon introduced into the charged air stream followed by desorption by means of a stream of steam involves on the one hand the recovery of the solvent for re-use and on the other hand the assistance in the fight against pollution of the environment by achieving as complete a liberation as possible of the charged air stream from the solvent vapours entrained with it.

Previously known processes and apparatus are not able to solve these two problems in a satisfactory manner. This is to be attributed in the main to the fact that the operations of adsorption on the one hand and of desorption or regeneration of the active carbon on the other, cannot be adjusted in regard to time or rate of flow in relation to one another in such a way that operational conditions can be achieved which are adequate for the requirements of protection of the environment, whilst making an economical use of the sources of energy for the adsorption and regeneration processes.

SUMMARY OF THE INVENTION

For the purpose of solving the foregoing problem, the invention starts off from the idea that the ratio between the intervals of charging and regeneration of the carbon would have to be adapted by suitable regulation processes to fit in with the requirements which show a wide range of fluctuation, so as to achieve both a satisfactory efficiency and also the economy of these two operation.

Accordingly, the present invention consists in a process for the separation of solvents from charged air stream (as hereindefined) by adsorption by means of active carbon introduced into the air stream followed by regeneration with desorption by means of a stream of steam, using two or more active carbon chambers, characterised in that the sequence of charging and regeneration intervals $(t_B, t_R)$ is regulated automatically depending upon the concentration of the solvent vapours in said air stream.

For the purpose of automation the sequence of intervals can be controlled according to a prescribed time programme adapted to the concentration of the solvent vapours. In order also to comply with unforeseen fluctuations in the values and operations, the change as between adsorption and regeneration can be automated in that the active carbon chambers are switched over from adsorption to regeneration when a prescribed concentration threshold is exceeded by a measuring device which is arranged on the outlet side and responds to the concentration of the solvent vapours in the effluent charged air stream.

An economical steam consumption, combined with a shortening of the regeneration period, can be achieved when switching over from adsorption to regeneration by first of all switching to desorption by steaming with a large volume of steam and then, preferably when steam breaks through on the outlet side of the active carbon chamber, switching over to steaming with a smaller volume of steam.

A considerable improvement in the adsorption conditions can be achieved if the charged air stream when it is switched over to adsorption operation finds the active carbon bed dried. For this purpose it is possible to arrange after each desorption interval a drying interval with the drying of the active carbon, which has been wetted by the stream of steam, by means of a air stream separate from the charged air stream. In doing so, a rapid drying with an optimum temperature control of the active carbon for the purpose of the subsequent adsorption can be achieved when switching over from desorption to drying by first of all operating with heated dry air and then with cooled dry air. The switching over from heated drying air to cooled drying air is advantageously effected by a hygrometer arranged on the outlet side when the humidity falls below a prescribed degree.

For the purpose of optimum adaptation it is advantageous if in a parallel operation of several active carbon chambers of given size the number of chambers is selected so as to correspond at least to the magnitude $n = (t + t_R)/t$ rounded up to the next whole number, and if when doing so the adsorption interval and the regeneration interval are staggered in relation to one another in such a way that at least one chamber is at all times being operated in the adsorption interval.

BRIEF DESCRIPTION OF THE DRAWINGS

In order that the invention may be more readily understood, reference is made to the accompanying drawings which illustrate diagrammatically and by way of example one embodiment thereof, and in which.

DETAILED DESCRIPTION OF THE DRAWINGS

Figure 1:
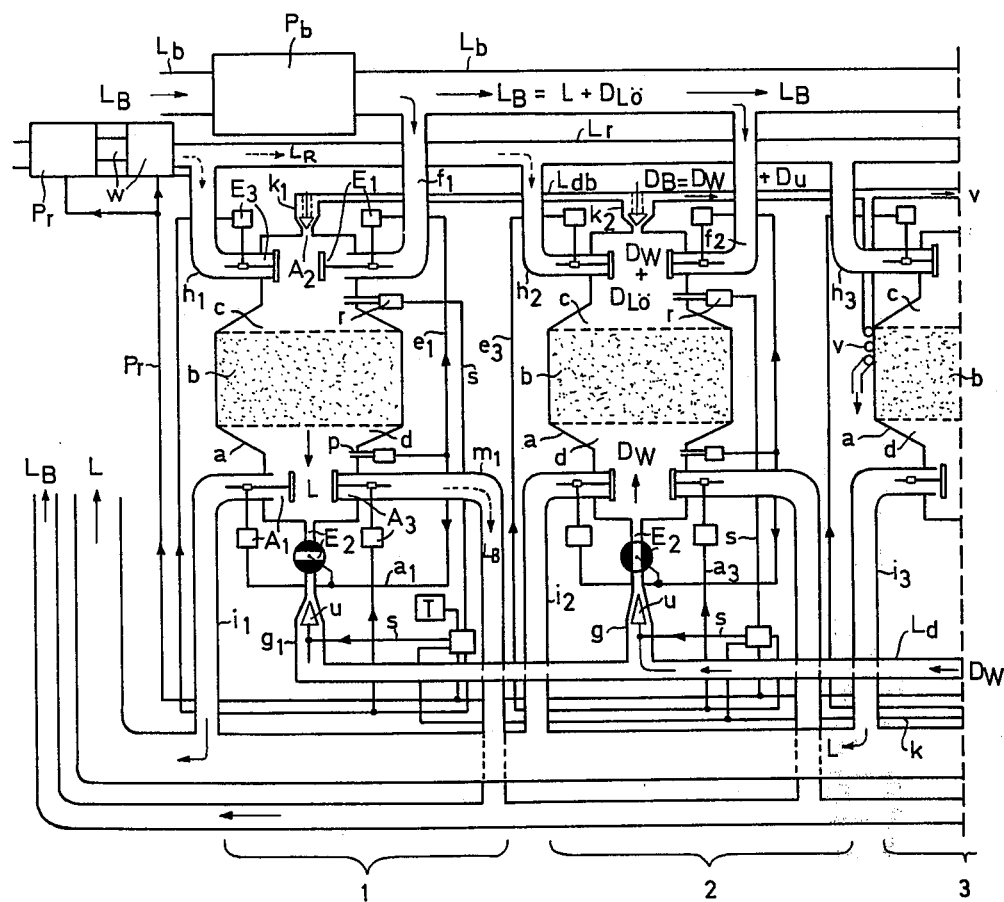
FIG. 1 shows part of an apparatus according to the invention.

The apparatus shown in FIG. 1 serves for the separation of solvents from a charged air stream $L_B$ carrying solvent vapours $D_{Lo}$ by the adsorption of the solvent vapours by means of active carbon introduced into the charged air stream followed by desorption by means of a stream of steam $D_W$.

The charged air stream $L_B$ fed by means of a fan $P_b$ through a charge pipe $L_b$ is fed in several partial streams via connecting pipes $f_1, f_2, f_3 \ldots f_n$, of which only the first two are represented in the drawing, to a corresponding number of active carbon tanks $a$ via a controllable inlet $E_1$ of the top chamber $c$ and is freed from the solvent vapour $D_{Lo}$ by adsorption in the activated carbon bed $b$. The purified air L then passes through the bottom chamber $d$, an outlet $A_1$ and connecting pipes $i_1, i_2, i_3 \ldots$ as far as the outlet air pipe $L_1$ for the purified air L.

Experience has shown that the charging with solvent of the active carbon bed $b$ takes place in such a way that the charging gradually progresses from the inlet side to the outlet side of the active carbon bed $b$. As soon as the charge front reaches the outlet side of the active carbon bed, the concentration of the solvent capour in the bottom chamber $d$ increases suddenly and acting via a concentration gauge head $p$ and control lines $a_1$ and $e_1$ effects a closure of the outlet $A_1$ and inlet $E_1$ and also the opening of the inlet $E_2$ for the purpose of feeding in steam $D_W$ from a steam pipe $L_d$ via the connecting pipe $g_1, g_2, g_3 \ldots$ or $g_n$ belonging to the activated carbon tank concerned into the bottom chamber $d$ for the purpose of the desorption of the adsorbed solvent vapours from the active carbon. This control condition is represented in FIG. 1 for example for the second active carbon tank $a$.

For the entering steam stream the active carbon bed $b$ first of all acts like a condenser, until the entire carbon bed has become heated to the temperature of the incoming steam. This heating up of the carbon bed takes place with a supply of steam under high pressure. Then the steam pressure in the top chamber $c$ also rises to a level which is only slightly lower than in the bottom chamber $d$ and acting via a steam pressure gauge head $r$ and a control line $s$ with a timer $T_1$ brings about the switching over of a steam throttle $u$ to a higher flow resistance for the purpose of reducing the quantity of steam fed in. Instead of individual steam throttles $u$ in each of the connecting pipes $g_1, g_2, g_3 \ldots$ it is possible for the throttling of the steam to be carried out by a single steam throttle in the steam pipe $L_d$.

The solvent adsorbed by the active carbon is entrained by the flowing steam and passes via an outlet $A_2$ and short connecting pipes $K_1, K_2, K_3 \ldots$ to a pipe $L_{db}$ for the mixture $D_B$ consisting of steam $D_W$ and solvent vapour $D_{Lo}$. This vapour mixture is fed to a condenser $v$ and the condensate flowing out of the condenser is separated into water and solvent in a separating vessel not shown in the drawing, after which the solvent is despatched for renewed use, for example in an installation for the chemical cleaning of metal parts.

The timer $T_1$ is adjusted in such a way that the adsorbed solvent is driven out of the active carbon bed $b$ down to a negligible residue. After the expiry of a predetermined interval of time for the desorption, the inlet $E_2$ and the steam throttle $u$ are set back and at the same time or a short time afterwards a regeneration air stream $L_R$ is switched on for the activated carbon bed subjected to desorption. The regeneration air stream $L_R$ consists of a stream of pure air which is fed from a fan $P_r$ via a pipe $L_r$, connecting pipes $h_1, h_2, h_3 \ldots$ and inlets $E_3$ to the top chamber $c$ of the active carbon tank which has previously been subjected to desorption. For this purpose the timer T is connected via control pipes $e_3$ and $a_3$ with an inlet $E_3$ and an outlet $A_3$, which are opened by control signals produced by the timer $T_1$ and in this way releases the passage for the regeneration air stream through the carbon bed.

The fan $P_r$ is switched on at the same time by the timer $T_1$ via a control line $p_r$. The fan $P_r$ is combined with a heating and cooling apparatus $w$, this being done in such a way that first of all a hot regeneration air stream is passed through the carbon bed $b$ which is still wet from the steam and dries the carbon, and then a cooled regeneration air stream reduces the temperature of the dried carbon to a low value which is suitable for the subsequent adsorption operation.

By means of the regeneration air stream first of all the water still adhering to the active carbon is evaporated, the steam entraining with it residues of solvent in the vapour form. In this way there is obtained in the bottom chamber $d$ of the relevant carbon tank a mixture $L_B'$ of regeneration air $L_R$, steam $D_W$ and solvent vapour $D_{Lo}$, which is discharged as a secondary charged air stream $L_B'$ via a connecting pipe $m_1, m_2, m_3 \ldots$ and an exhaust air pipe $L_2$. This mixture is advantageously blown off into the free atmosphere, whilst the pure air pipe $L_1$ can lead into the workshed in order to avoid heat losses during the heating periods.

Figure 3:
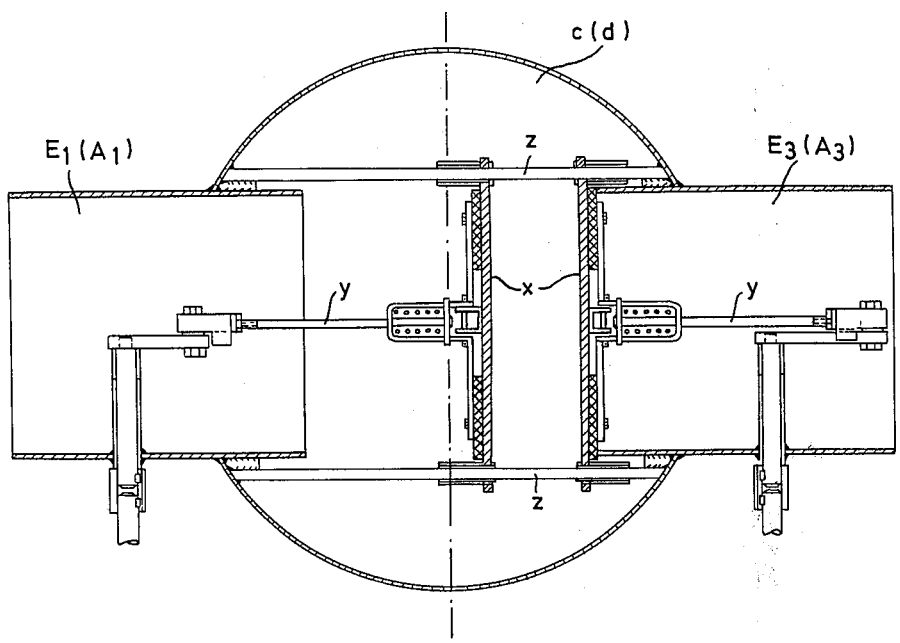
FIG. 3 is an enlarged plan view of the bottom chamber of an active carbon tank of the apparatus according to FIG. 1 with plate valves for charged air stream and regeneration air stream.

The inlets $E_1$ and $E_3$ as well as the outlets $A_1$ and $A_3$, as shown in greater detail in FIG. 3 are designed as plate valves $x$ with an eccentric closure $y$, which are operated by servomotors via the control lines $a$, and $a_3$. The inclusion of these plate valves into the top chamber $c$ or bottom chamber $d$ of the activated carbon tanks offers both constructional and operational advantages. In particular the large cross-sections of the top chamber and the bottom chamber can be utilised with the advantage of correspondingly low flow resistances. Furthermore simple conditions are obtained in the erection of the plant, because valve fittings which would otherwise be required in connecting pipes are dispensed with. As is shown in FIG. 3, the travel of the plate valves can pass beyond the middle of the chambers, because only one of the two oppositely disposed valves is opened at a time. For this purpose it is advantageous for the two valves to have joint plate guides $z$.

The outlets $A_2$ for the steam charged with solvent are provided with simple non-return valves which are of such dimensions are are so adjustable that they maintain the outlets $A_2$ of the active carbon tanks operating in the charging operation closed and only open the outlet $A_2$ of the activated carbon tank operating in the desorption operation at a steam pressure in the top chamber $c$ which is considerably higher than the air pressure produced by the charged air stream in the top chamber.

The timers $T_1, T_2, T_3 \ldots$ are connected with one another by a coupling line $k$ and are designed in such a way that only one timer operates in its control interval for the regeneration operation of the carbon tank belonging to it, and that this sets the timer of the following unit into operation within a predetermined period of time after the expiry of its operation period, regardless of whether the concentration in the following active carbon tank has already reached the level prescribed for initiating the operation of the timer or not. In this case, for starting up the apparatus a pulse generator T can be provided which sets the timer $T_1$ of the first unit in operation after the plant is switched on, and in this way the desired working sequence of the other timers is introduced via the coupling line $k$. During the subsequent period, as soon as the concentration in one of the bottom chambers $d$ exceeds the maximum permissible value, the regeneration period is initiated in the unit concerned prematurely by the concentration gauge head $p$. At the same time the pulse generator T can be switched over automatically to suitably more rapid timing sequence. Conversely, in the case of the concentration falling below a prescribed minimum when switching over to regeneration the pulse generator T can be switched over to a slower sequence of pulses.

Figure 2:
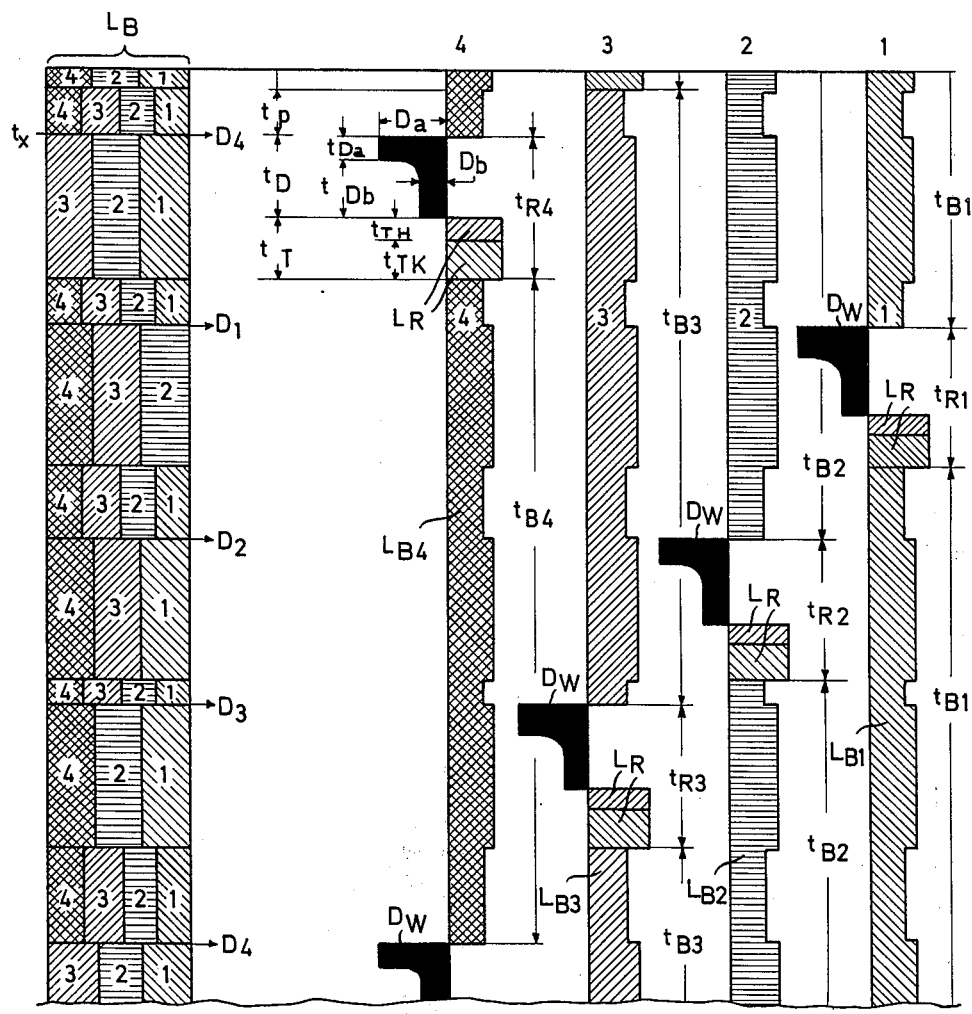
FIG. 2 shows a functional diagram to illustrate the mode of operation of the apparatus according to FIG. 1.

FIG. 2 illustrates the mode of operation of an apparatus according to FIG. 1 with four adsorber units 1, 2, 3, 4. The charged air stream $L_B$, which for the sake of simplicity has been assumed to be constant, as soon as one of the active carbon tanks, for example in the case of a break-through $D_4$ of the solvent vapours through the active carbon bed of unit 4 at the time $t_x$ with the switching over of this unit to regeneration during the relevant regeneration period $t_{R4}$, flows in three equal parts to the units 1,2 and 3. In the unit 4 the desorption takes place first of all during a period $t_{Da}$ with a large quantity of steam $D_a$ and is then switched over by the steam pressure gauge head $r$ for a period of time $t_{Db}$ to the smaller quantity of steam $D_B$ suitable for desorption.

At the end of the steaming period $T_D$, which is determined by the pre-set running time of the timer $T_4$, the unit 4 is switched over to regeneration by the drying and cooling air stream $L_R$, and when this is done the timer $T_4$ or a separate timer in the air stream producer $P_r$ or in the heating and cooling apparatus $w$ determine the drying interval $t_T$ and its partial intervals $t_{TH}$ and $T_{TK}$ for drying with hot and cold drying air. After the regeneration air stream has been switched off, the unit 4 is switched over once again either immediately or with a predetermined time lag to the charging operation for an interval of time $t_{B4}$.

In a regeneration pause $t_p$, during which all four units 1 to 4 are switched on to charging operation, the charged air stream $L_B$ is distributed uniformly to all four active carbon tanks. At the end of this regeneration pause the unit 1, either as a result of a breakthrough $D_1$ via the relevant concentration gauge head $p$ or via a switching order which is issued by the timer $T_4$ via the coupling loop $k$ to the timer $T_1$ is switched over to regeneration operation. In the unit 1 and then in the units 2,3 the same operations are repeated as have been described above for the regeneration and charging operation of unit 4.

The regeneration pauses $t_p$, if the switching over to regeneration operation is determined by the concentration gauge head $p$, are naturally of different lengths on account of the concentration fluctuations which occur. The apparatus is designed in such a way that none of the subsequent regeneration intervals $t_{R1}, t_{R2}, t_{R3}, t_{R4}$ overlap, but that these intervals follow one another either with or without a pause. Advantageously the regeneration pauses are made small as compared with the working cycles consisting of the charging interval and the subsequent regeneration interval. According to the working conditions obtaining, this is effected mainly by measuring the concentration (as represented in FIG. 2) or by time control or by a combination of concentration measurement and time control, for example in that after the expiry of a regeneration interval the next unit in the sequence is switched over after a prescribed waiting period from charging to regeneration, provided it has not already been switched over to regeneration as a result of control based on concentration.

We claim:

1. A process for the separation of solvents from charged air stream laden with solvent vapours by adsorption by means of active carbon introduced into the air stream during a charging time interval followed by regeneration with desorption by means of a stream of steam during a regeneration time interval, using two or more active carbon chambers, which process includes the steps of automatically regulating the sequence of charging and regeneration time intervals in accordance with the concentration of the solvent vapours in said air stream, subjecting the active carbon to desorption by steaming with a first volume of steam introduced into an active carbon chamber when switching over from charging to regeneration and then subjecting said active carbon to steaming with a second volume of steam that is less than said first volume when steam from said first volume breaks through on the outlet side of the active carbon chamber.

2. Process in accordance with claim 1, wherein the desorption is carried out with superheated steam.

3. Process in accordance with claim 2, wherein towards the end of the desorption interval ($t_D$) the desorption or drying is carried out with superheated steam.

4. Process in accordance with claim 1, wherein the supply of steam is reduced proportionally to the occurrence of solvent at the outlet from the active carbon chamber.

5. Process in accordance with claim 4, wherein the reduction of steam supply is carried out continuously.

6. Process in accordance with claim 4, wherein the reduction of steam supply is carried out in stages.

* * * * *